Figure 1:
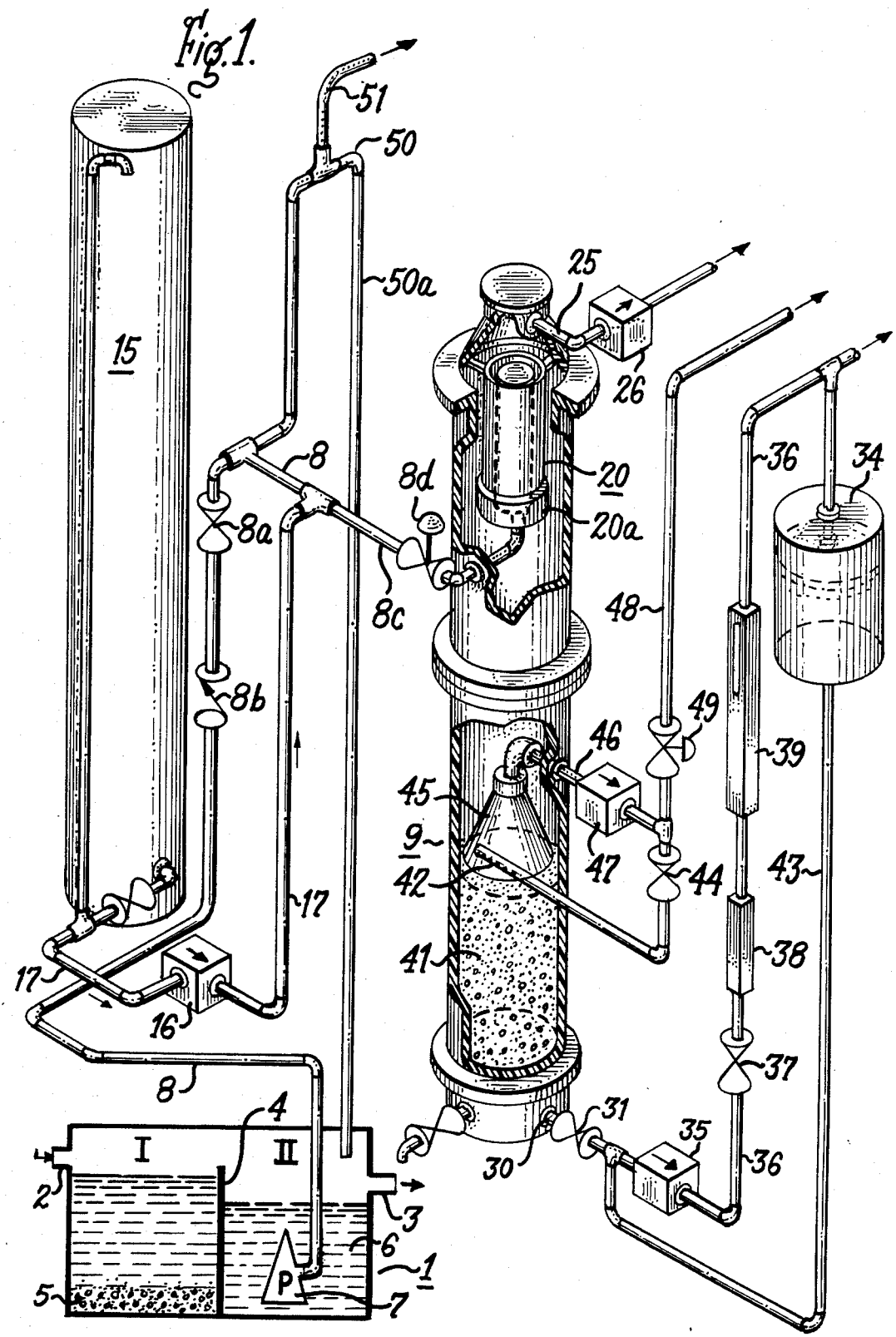

United States Patent [19]
Krofta

[11] Patent Number: 4,673,494
[45] Date of Patent: Jun. 16, 1987

[54] WATER TREATMENT APPARATUS

[75] Inventor: Milos Krofta, Lenox, Mass.

[73] Assignee: Lenox Institute For Research, Inc., Lenox, Mass.

[21] Appl. No.: 771,105

[22] Filed: Aug. 30, 1985

Related U.S. Application Data

[63] Continuation-in-part of Ser. No. 625,089, Jun. 27, 1984, abandoned.

[51] Int. Cl.[4] .............................................. C02F 1/24
[52] U.S. Cl. ................................ 210/202; 210/221.2; 210/260; 210/279
[58] Field of Search ...................... 210/221.2, 707, 258, 210/260, 266, 275–277, 279, 243, 201–203, 108

[56] References Cited

U.S. PATENT DOCUMENTS

| | | | |
|---|---|---|---|
| 3,663,413 | 5/1972 | Marmo | 210/221.2 X |
| 3,956,128 | 5/1976 | Turner | 210/221.2 X |
| 3,977,970 | 8/1976 | Willis et al. | 210/221.2 X |
| 4,338,192 | 6/1982 | Krasnoff et al. | 210/221.2 |
| 4,377,485 | 3/1983 | Krofta | 210/221.2 X |

Primary Examiner—Tom Wyse
Attorney, Agent, or Firm—Sidney Greenberg

[57] ABSTRACT

Apparatus for treatment of septic tank effluent to remove suspended particles for clarifying and purifying the water prior to discharge into the leaching field or for use for other purposes. The apparatus, which is small enough to be conveniently installed in individual households, comprises a vertical main tank, flocculation material supply means to form flocs for combining with suspended solids in the unclarified water introduced into the main tank, a water electrolysis unit in the main tank for producing gaseous bubbles to which the flocs become attached and which rise to the surface where the entrapped solids are removed and returned to the septic tank, and a filter device at the bottom of the main tank for removing remaining precipitated flocs with entrapped solids. The anode of the electrolysis unit is made of aluminum to provide aluminum hydroxide as a flocculating agent.

3 Claims, 2 Drawing Figures

WATER TREATMENT APPARATUS

This application is a continuation-in-part of the application of Milos Krofta, Ser. No. 625,089 filed June 27, 1984, and entitled Water Treatment Apparatus, now abandoned.

The present invention relates to apparatus for the treatment of liquids to remove suspended solids, and more particularly concerns apparatus for clarifying and purifying waste water such as septic tank effluent.

The present invention is related to the invention disclosed in the Krofta U.S. Pat. No. 4,377,485 issued Mar. 22, 1983, but provides certain advantages over the latter water treatment apparatus. For example, whereas the latter is relatively large in structure and capacity, comprises moving parts of substantial size, and is designed principally for treatment of a large volume of water in a municipal or industrial treatment plant, the device of the present invention is relatively small and compact, is adapted for use in individual households, and dispenses with moving parts such as characerize the apparatus of the Krofta patent.

It is an object of the invention to provide a novel liquid treatment apparatus of the above type for clarifying water using flocculation, flotation and filtration processes.

It is a particular object of the invention to provide a liquid treatment apparatus which is particular adapted for treating septic tank effluent to remove suspended particles therefrom.

Another object of the invention is to provide apparatus of the above type which is relatively simple and compact in structure, is relatively low in cost, and does not require moving parts for the liquid treatment process.

Other objects and advantages will become apparent from the following description and the appended claims.

With the above objects in view, the present invention in one of its aspects relates to apparatus for treatment of unclarified water comprising an upwardly extending elongated main tank, conduit means for introducing unclarified water into the main tank, supply means connected to the conduit means for adding flocculating material to the unclarified water, the conduit means introducing the mixture of unclarified water and flocculating material into the main tank, means providing gaseous material in the main tank for floating flocculating material including attached contaminant particles in the water to the upper portion of the main tank, means at the upper tank portion for removing the floating flocculating material, filter means at the bottom portion of the main tank for removing downwardly flowing flocculated material, and discharge means for removing the thus clarified water.

In a preferred embodiment of the invention, the provision of gaseous material in the main tank is achieved by locating a water electrolysis unit within the upper portion of the main tank for producing bubbles of hydrogen and oxygen which rise to the surface with contaminant particles attached thereto.

As used herein, the term "suspended particles" includes colloidal particles.

Figure 2:
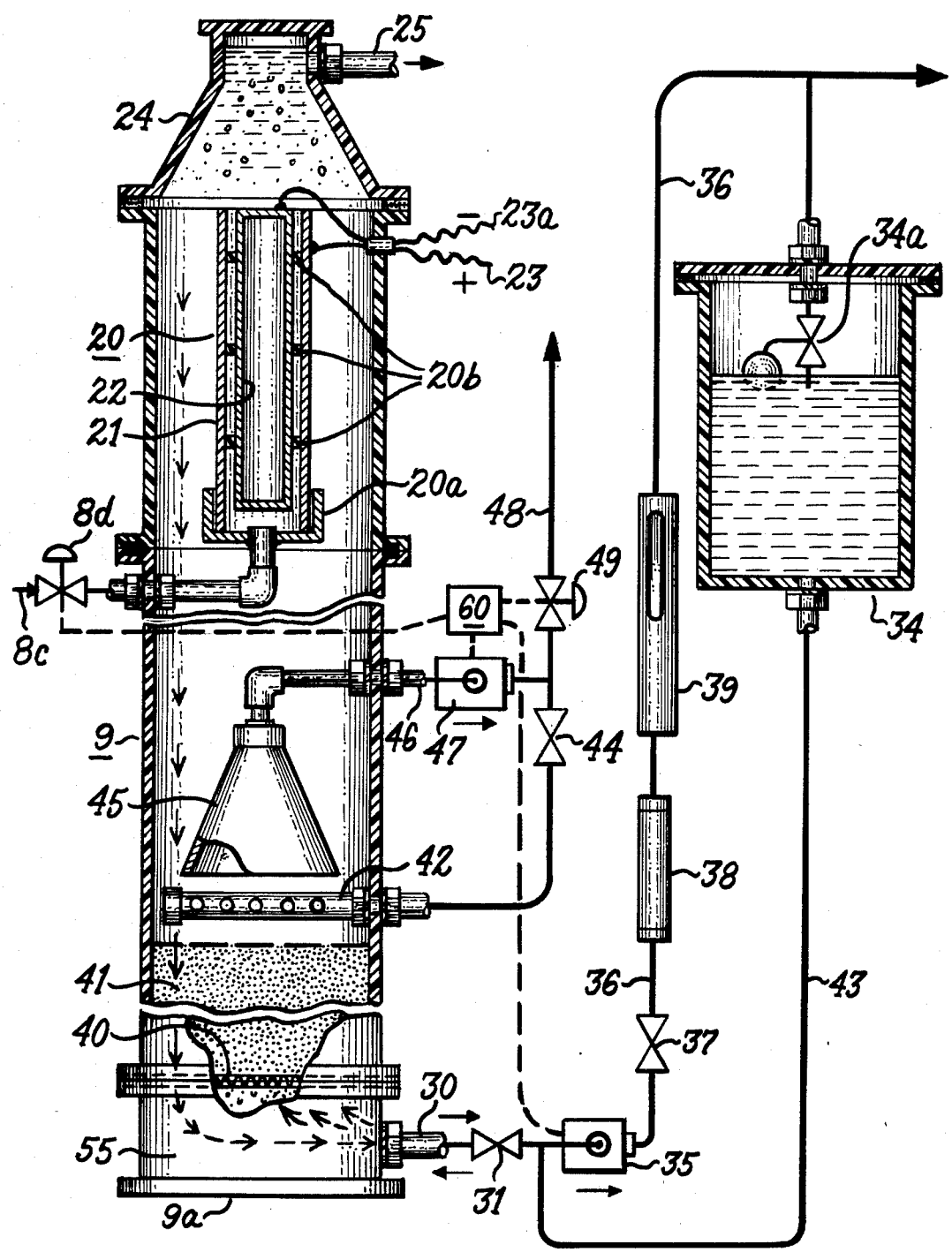

The invention will be better understood from the following description taken in conjunction with the accompanying description taken in conjunction with the accompanying drawings, in which:

FIG. 1 is a somewhat diagrammatic view in perspective of an embodiment of the water treatment apparatus of the invention; and FIG. 2 shows in enlarged scale portions of the apparatus shown in FIG. 1.

Referring now to the drawings, and particularly to FIG. 1, there is shown in schematic form a septic tank 1 of a type conventionally installed on the premises of individual households and having inlet 2 for the entry of household waste into the tank and outlet 3 for passage of the liquid effluent to a leaching field through suitable conduit means (not shown), as well known in the art. Baffle partition 4 extending upwardly to just below the level of inlet 2 divides tank 1 into two compartments, such that when the liquid influent fills the first compartment it spills over the top of partition 4 into the second compartment.

Semi-solid waste or sludge 5 settles to the bottom of the first compartment, from which it is periodically removed in accordance with known practice.

The waste liquid 6 which accumulates in the second compartment, herein termed unclarified waste water, contains suspended contaminant particles including bacteria and other organic material, and having undesirable color or turbidity. and as such is unfit for further household use without additional treatment. This liquid is treated by the clarifying apparatus of the present invention to provide water markedly improved appearance and purity which can be used for various household purposes, or discharged into streams.

To this end, in the embodiment illustrated, pump 7 is arranged in the second compartment of septic tank 1 to pump the unclarified water through supply pipe 8 to main tank 9 where the principal clarification treatment takes place. Pump 7 includes a suitable control device (not shown) for turning the pump on when the water in the second compartment is at an upper predetermined level and turning the pump off when the water drops to a lower predetermined level.

Storage tank 15 contains a solution of a polyelectrolyte which is transmitted through pipe 17 by pump 16 to supply pipe 8, and enters pipe 8c near its entry to the upper portion of main tank 9. The polyelectrolyte serves as a flocculating agent in the unclarified water introduced into tank 9 and may be any of a number of known materials for this purpose.

Supply pipe 8 has connected therein manual control valve 8a and check valve 8b between pump 7 and its junction with pipe 17, and solenoid valve 8d is located in pipe 8c near its entry into tank 9.

As seen best in FIG. 2, a water electrolysis unit 20 is arranged in the upper portion of tank 9 for producing minute gaseous bubbles of hydrogen and oxygen which rise to the surface of the liquid in the tank, carrying with them the entrained particle-attached flocs in the liquid. The illustrated electrolysis unit 20 comprises outer metal cylinder 21 serving as the anode and inner metal cylinder 22 serving as the cathode of the electrolyzer. Preferably, anode 21 is made of aluminum, for reasons explained below, while cathode 22 may be of any suitable metal such as steel. Anode 21 is open at top and bottom and is seated on base member 20a. Cathode 22, which is closed at top and bottom, is positioned concentrically within anode 21 so as to provide a cylindrical space between the electrodes, the electrodes being held in spaced relation by a plurality of spacer blocks 20b made of insulating material such as plastic. The unclarified water entering tank 9 through pipe 8c flows upwardly through the thus formed cylindrical space between the electrodes. Suitable conducting leads 23,23a connected respectively to the anode and cathode serve to supply direct current to the electrolysis unit, as shown in FIG. 2.

In addition to providing gaseous bubbles as described above, the electrolysis unit 20 when energized produces a flocculating agent, aluminum hydroxide, as a result of the reaction of the electrolyzed solution with the aluminum electrode, the latter thus serving as a sacrificial anode, and as a result it need not be periodically cleaned as in the case of known types of electrolysis units.

While the above described arrangement of the electrodes in the electrolysis unit is preferred, it will be understood that the aluminum anode may be arranged as the inner electrode within the outer cylindrical cathode.

Where necessary or desirable, sodium chloride may be added to polyelectrolyte tank 15 and thereby introduced in solution to the unclarified water supplied to main tank 9. The sodium chloride serves to increase the conductivity of the water electrolyzed in electrolysis unit 20 and also provides for disinfecting the water due to production of chlorine gas in the operation of the electrolysis unit.

The top of main tank 9 comprises a conical hood 24 into which discharge pipe 25 is inserted in contact with the sludge layer formed on the water surface by the floating flocculated material. As seen in FIG. 1, pump 26 arranged in pipe 25 discharges the collected sludge into septic tank 1.

At its bottom, treatment tank 9 has a filter device for filtering the water therein, the filtered water passing out of the bottom of tank 9 through outlet pipe 30 and manual valve 31, the thus clarified water being discharged by pump 35 through outlet pipe 36 in which is located manual valve 37, flow meter 38, and ultraviolet disinfecting unit 39, which kills any bacteria and viruses remaining in the water. The thus treated water is thereafter discharged into the leaching field of the septic tank or conveyed to other suitable locations for various household uses, or for discharge into streams.

The filter device at the bottom of main tank 9, as seen best in FIG. 2, comprises a screen 40 extending across tank 9 and spaced several inches above its bottom wall 9a, so as to define a filtered water chamber 55 below screen 40. A layer of sand 41 fills the space in tank 9 above filter screen 40 to a depth of about 12 inches, the screen (typically of metal) serving to support the sand layer while allowing passage of the liquid therethrough. Extending into and substantially across tank 9 between sand layer 41 and hood 45 is perforated pipe 42 connected via manual valve 44 to outlet pipe 48 between discharge pump 47 and solenoid valve 49, as seen in FIG. 2.

Mounted in tank 9 above sand filter 41 is backwash collector hood 45 connected at its upper end by outlet pipe 46 to discharge pump 47. Collector hood 45 receives sludge material from the surface of sand filter 41 which is then discharged by pump 47 to the second compartment of septic tank 1 via pipe 48 in which is located solenoid valve 49.

Positioned about two feet above the height of main tank 9 is backwash water tank 34 connected at its inlet to discharge pipe 36 as shown in the drawings. Outlet pipe 43 connected at the bottom of tank 34 is connected at its lower end to the pipe connecting valve 31 and discharge pump 35. Tank 34 thus receives a portion of the clarified water discharged through pipe 36 which is used for filter backwash purposes, as disclosed more fully below. Tank 34 is equipped with float valve 34a connected to the tank inlet for controlling the level of water in tank 34.

Connected to pipe 8 at one end (see FIG. 1) is U-shaped pipe 50 having an air vent 51 and having at its other end a discharge pipe 50a extending downwardly to the second compartment of septic tank 1. Pipe 50 is typically positioned about one to two feet above the level of liquid in main tank 9 so as to maintain a positive pressure on sludge discharge pump 26.

In the operation of the described apparatus, the septic tank effluent is pumped into main treatment tank 9 by pump 7. On its way to tank 9, the unclarified liquid passes through pipe 8c where it is mixed with the polyelectrolyte entering from pipe 17, so as to form a precipitate comprising flocculates or "flocs". As the liquid enters the bottom of electrolysis unit 20 in main tank 9, it further mixes with the flocculates formed by the aluminum hydroxide previously mentioned. The flocculates with entrapped solid particles attach to the gaseous bubbles which form in the electrolysis unit and rise therewith to the surface of the liquid in tank 9, forming a floating layer of sludge thereon. This sludge is removed via pipe 25 to the first compartment of the septic tank by pump 26.

Most of the contaminant particles inthe unclarified water are removed by the described flotation and sludge removal process.

As unclarified liquid is continually supplied to tank 9, the liquid with remaining floc material is drawn downwardly therein by discharge pump 35 and passes through sand filter 41 and screen 40, entering chamber 55 from which it is drawn into discharge pipe 36 by action of pump 35, so that the clarified water passes through ultraviolet unit 39 and is discharged into a leaching field or other location for further use, while a portion thereof enters tank 34 as controlled by float valve 34a.

The flow of liquid into the system which exceeds the flow out of the system is bypassed back to the septic tank via the outlet pipe of U-shaped pipe 50.

As sludge or dirt material accumulates on the surface of sand filter 41, the liquid flow through the sand decreases. to maintain the proper flow through the system, the sand is cleansed periodically. In this cleansing cycle, solenoid valve 8d is closed, solenoid valve 49 is opened, backwash discharge pump 47 is energized, and clarified water pump 35 is turned off. These operations are initiated automatically by timer means 60, as indicated in FIG. 2. As a result, clear water from tank 34 enters chamber 55 at the bottom of tank 9 and passes upwardly through sand filter 41, lifting the deposited sludge material from the sand layer surface. This sludge material is collected by hood 45 and discharged by pump 47 via pipe 48 back to the second compartment of the septic tank. During this process, a small predetermined amount of the liquid discharged by pump 47 is diverted through valve 44 into perforated pipe 42 for further cleansing of the sand filter. Automatically, at the end of the backwash cycle, by action of timer means 60, solenoid valve 8d is opened, solenoid valve 49 is closed, pump 47 is turned off, and pump 35 is turned on, thus resuming the water clarification cycle.

In a typical installation, main treatment tank 9 is about 5 feet high and 8 inches in diameter, tank 34 is about one foot high and 8 inches in diameter holding about 3 gallons, and the flow rate through the system is about 1000 gallons per day.

There is thus provided by the invention a water treatment apparatus which efficiently clarifies and purifies waste water such as septic tank effluent, occupies a relatively small space, does not require moving parts for the liquid treatment process, and is relatively low in cost. The apparatus is particularly suitable for use in treating septic tank effluent to remove organic matter therein for return of the effluent to the leaching field, thus avoiding problems often resulting heretofore from seepage of untreated septic tank effluent from the leaching field to nearly lakes or other sources of water supply. It will be understood, however, that the described system may be used for purifying other contaminated or unclarified water sources, such as lakes or streams, to render the water potable or otherwise fit for household use.

While the present invention has been described with reference to particular embodiments thereof, it will be understood that numerous modifications may be made by those skilled in the art without departing from the scope of the invention. Therefore, the appended claims are intended to cover all such equivalent variations as come within the true spirit and scope of the invention.

What I claim as new and desire to secure by Letters Patent of the United States is:

1. Apparatus for treatment of unclarified water comprising, in combination, an upwardly extending elongated main tank closed at top and bottom, conduit means for introducing unclarified water into said main tank, supply means connected to said conduit means for adding flocculating material to the unclarified water, said conduit means introducing the mixture of unclarified water and flocculating material into said main tank, means comprising electrolysis means in said main tank for electrolyzing the water therein for generating gaseous material in said main tank for floating flocculated material including attached contaminant particles in the water to the upper portion of said main tank, means at said upper tank portion for removing the floating flocculated material, first hood means closing said main tank at its top for containing the floating flocculated material, said means for removing the latter material comprising pump means communicating with the interior of said first hood means for discharging the flocculated material collected therein, filter means at the bottom portion of said main tank for removing downwardly flowing flocculated material, said filter means comprising porous material having a surface on which said downwardly flowing flocculated material is deposited, means for cleaning the surface of said filter means comprising backwash means for lifting off said deposited flocculated material and means for removing and disposing of the latter material, said backwash means comprising clarified water collecting means connected to said main tank for introducing clarified water into said filter means, said means for removing and disposing of said deposited flocculated material comprising second hood means arranged in said main tank closely above said filter means for receiving the flocculated material, a discharge pump connected to said second hood means, and discharge pipe means connected to said discharge pump for disposing of said deposited flocculated material, said electrolysis means arranged between said first and second hood means, and clarified water discharge means for removing the thus clarified water.

2. Apparatus as defined in claim 1, said cleaning means comprising a perforated pipe arranged between said second hood means and said filter means and connected to said discharge pipe means for distributing on said filter means a portion of the liquid passing through said discharge pipe means.

3. Apparatus as defined in claim 1, first controlled valve means arranged in said conduit means, second controlled valve means arranged in said discharge pipe means, said clarified water discharge means comprising pump means, and means for controlling the operation of said first and second controlled valve means, said discharge pump, and said pump means for providing for cleaning of said filter means while interrupting the supply of unclarified water to said main tank.

* * * * *